United States Patent
Trainin et al.

(10) Patent No.: US 11,558,746 B2
(45) Date of Patent: Jan. 17, 2023

(54) PROTECTED WIFI SENSING MEASUREMENTS

(71) Applicant: QUALCOMM Incorporated, San Diego, CA (US)

(72) Inventors: Solomon Trainin, Haifa (IL); Alecsander Petru Eitan, Haifa (IL); Assaf Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/211,439

(22) Filed: Mar. 24, 2021

(65) Prior Publication Data

US 2022/0312212 A1   Sep. 29, 2022

(51) Int. Cl.
| | |
|---|---|
| *H04M 1/66* | (2006.01) |
| *H04W 12/106* | (2021.01) |
| *H04W 12/108* | (2021.01) |
| *H04W 12/61* | (2021.01) |
| *H04W 12/63* | (2021.01) |
| *H04W 48/16* | (2009.01) |
| *H04W 84/12* | (2009.01) |

(52) U.S. Cl.
CPC ....... *H04W 12/106* (2021.01); *H04W 12/108* (2021.01); *H04W 12/61* (2021.01); *H04W 12/63* (2021.01); *H04W 48/16* (2013.01); *H04W 84/12* (2013.01)

(58) Field of Classification Search
CPC ... H04W 12/06; H04W 12/108; H04W 12/10; H04W 12/106; H04L 63/08; H04L 9/3297; H04L 63/123
See application file for complete search history.

(56) References Cited

U.S. PATENT DOCUMENTS

| | | | | |
|---|---|---|---|---|
| 9,043,602 | B1 * | 5/2015 | Krieger | H04W 12/06 713/181 |
| 2003/0231650 | A1 * | 12/2003 | Shoemake | H04L 69/22 370/464 |
| 2005/0141498 | A1 | 6/2005 | Cam Winget et al. | |
| 2006/0056443 | A1 * | 3/2006 | Tao | H04L 1/1628 370/469 |
| 2008/0250500 | A1 * | 10/2008 | Olson | H04L 63/1416 726/22 |
| 2014/0269773 | A1 * | 9/2014 | Wentink | H04L 63/123 370/476 |

(Continued)

FOREIGN PATENT DOCUMENTS

WO   WO-2017064361 A1   4/2017

OTHER PUBLICATIONS

International Search Report and Written Opinion—PCT/US2022/017073—ISA/EPO—dated May 10, 2022.

*Primary Examiner* — Shantell L Heiber
(74) *Attorney, Agent, or Firm* — Holland & Hart LLP

(57) ABSTRACT

This disclosure provides systems, methods, and apparatuses for wireless communication. In some aspects, An example method includes receiving, from a second wireless communication device, a frame associated with one or more wireless sensing measurements, verifying an integrity of the received frame associated with a message integrity code (MIC) in the received frame, and obtaining one or more wireless sensing measurements associated with the received frame.

27 Claims, 8 Drawing Sheets

(56) References Cited

U.S. PATENT DOCUMENTS

| | | | |
|---|---|---|---|
| 2015/0341794 A1* | 11/2015 | Vanderveen | H04W 12/10 |
| | | | 713/181 |
| 2018/0063788 A1* | 3/2018 | Yang | H04W 12/108 |
| 2018/0288730 A1* | 10/2018 | Küchler | H04W 4/029 |
| 2019/0200278 A1 | 6/2019 | Ouzieli et al. | |
| 2019/0246351 A1* | 8/2019 | Yang | H04W 52/0229 |
| 2020/0359248 A1* | 11/2020 | Sadeghi | H04W 28/18 |
| 2020/0404496 A1* | 12/2020 | Chu | H04W 52/0216 |
| 2021/0258877 A1* | 8/2021 | Chitrakar | H04W 52/0216 |

* cited by examiner

PROTECTED WIFI SENSING MEASUREMENTS

TECHNICAL FIELD

This disclosure relates generally to wireless sensing, and to using wireless signals and their reflections to sense objects in an environment.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

WLAN sensing or WiFi sensing generally refers to a WLAN in which one or more WLAN devices monitor or map the environment using standard WLAN signals. For example, a WiFi sensing system may use the signal reflections off of walls or other objects, including people, to map and measure the environment, and to identify and track objects within that environment.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. An example first wireless communication device includes an interface configured to obtain a frame associated with one or more wireless sensing measurements. The first wireless communication device also includes a processing system configured to verify an integrity of the frame associated with a message integrity code (MIC) in the frame. The interface is also configured to obtain one or more wireless sensing measurements associated with the frame.

In some implementations, the MIC is configured to protect the integrity of a timestamp of the frame. In some aspects, verifying the integrity of the frame includes validating the timestamp with the MIC. In some aspects, verifying the integrity of the timestamp is associated with a difference between an arrival time of the frame and the timestamp. In some aspects, verification of the integrity of the frame is associated with the difference between the arrival time of the frame and the timestamp being less than a threshold time. In some aspects, the processing system is further configured to refrain from verifying the integrity of the frame when the difference is greater than the threshold time. In some aspects the threshold time is associated with an estimated propagation time of the frame.

In some implementations, verifying the integrity of the frame includes verifying an entirety of one or more media access control (MAC) protocol data units (MPDUs) associated with the frame. In some implementations, verifying the integrity of the frame includes verifying one or more aggregated physical layer (PHY) protocol data units (A-PPDUs) associated with the received frame.

The processing system may be configured to establish a wireless sensing session with at least a second wireless device prior to receiving the frame. The interface may be configured to receive the frame from the second wireless communication device.

Another innovative aspect of the subject matter described in this disclosure can be implemented as a method for wireless communication. In some implementations, the method may be performed by a first wireless communication device. The method may include receiving a frame associated with one or more wireless sensing measurements. The method also may include verifying an integrity of the received frame associated with a message integrity code (MIC) in the received frame. The method also may include receiving one or more wireless sensing measurements associated with the received frame.

In some implementations, the MIC is configured to protect the integrity of a timestamp of the received frame. In some aspects, verifying the integrity of the frame includes validating the timestamp with the MIC. In some aspects, verifying the integrity of the timestamp is associated with a difference between an arrival time of the received frame and the timestamp. In some aspects, verification of the integrity of the received frame is associated with the difference between the arrival time of the received frame and the timestamp being less than a threshold time. In some aspects, method further includes refraining from verifying the integrity of the received frame when the difference is greater than the threshold time. In some aspects the threshold time is associated with an estimated propagation time of the received frame.

In some implementations, verifying the integrity of the frame includes verifying an entirety of one or more media access control (MAC) protocol data units (MPDUs) associated with the frame. In some implementations, verifying the integrity of the frame includes verifying one or more aggregated physical layer (PHY) protocol data units (A-PPDUs) associated with the received frame.

The method may include establishing a wireless sensing session with at least a second wireless communication device prior to receiving the frame. The frame may be received from the second wireless communication device.

Another innovative aspect of the subject matter described in this disclosure can be implemented in a non-transitory computer readable storage medium storing instructions for execution by one or more processors of a first wireless communication device. In some implementations, execution of the instructions may cause the first wireless communication device to perform operations including receiving a frame associated with one or more wireless sensing measurements. The operations also may include verifying an integrity of the received frame associated with a message integrity code (MIC) in the received frame. The operations also may include receiving one or more wireless sensing measurements associated with the received frame.

In some implementations, the MIC is configured to protect the integrity of a timestamp of the frame. In some aspects, verifying the integrity of the frame includes validating the timestamp with the MIC. In some aspects, verifying the integrity of the timestamp is associated with a difference between an arrival time of the frame and the timestamp. In some aspects, verification of the integrity of the frame is associated with the difference between the arrival time of the frame and the timestamp being less than a threshold time. In some aspects, operations further include refraining from verifying the integrity of the frame when the difference is greater than the threshold time. In some aspects the threshold time is associated with an estimated propagation time of the frame.

In some implementations, verifying the integrity of the frame includes verifying an entirety of one or more media access control (MAC) protocol data units (MPDUs) associated with the frame. In some implementations, verifying the integrity of the frame includes verifying one or more aggregated physical layer (PHY) protocol data units (A-PPDUs) associated with the received frame.

The operations may include establishing a wireless sensing session with at least a second wireless communication device prior to receiving the frame. The frame may be received from the second wireless communication device.

Another innovative aspect of the subject matter described in this disclosure can be implemented as a method for wireless communication. In some implementations, the method may be performed by a first wireless communication device. The method may include receiving a frame associated with one or more wireless sensing measurements. The method also may include verifying an integrity of the received frame associated with a message integrity code (MIC) in the received frame, the MIC configured to protect an integrity of at least a timestamp of the received frame. The method also may include, in response to verifying the integrity of the received frame, comparing the timestamp with an arrival time of the received frame. The method also may include, in response to the arrival time of the received frame exceeding the timestamp by more than a threshold time, discarding the received frame. The method also may include, in response to the arrival time of the received frame exceeding the timestamp by no more than the threshold time, receiving one or more wireless sensing measurements associated with the received frame.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
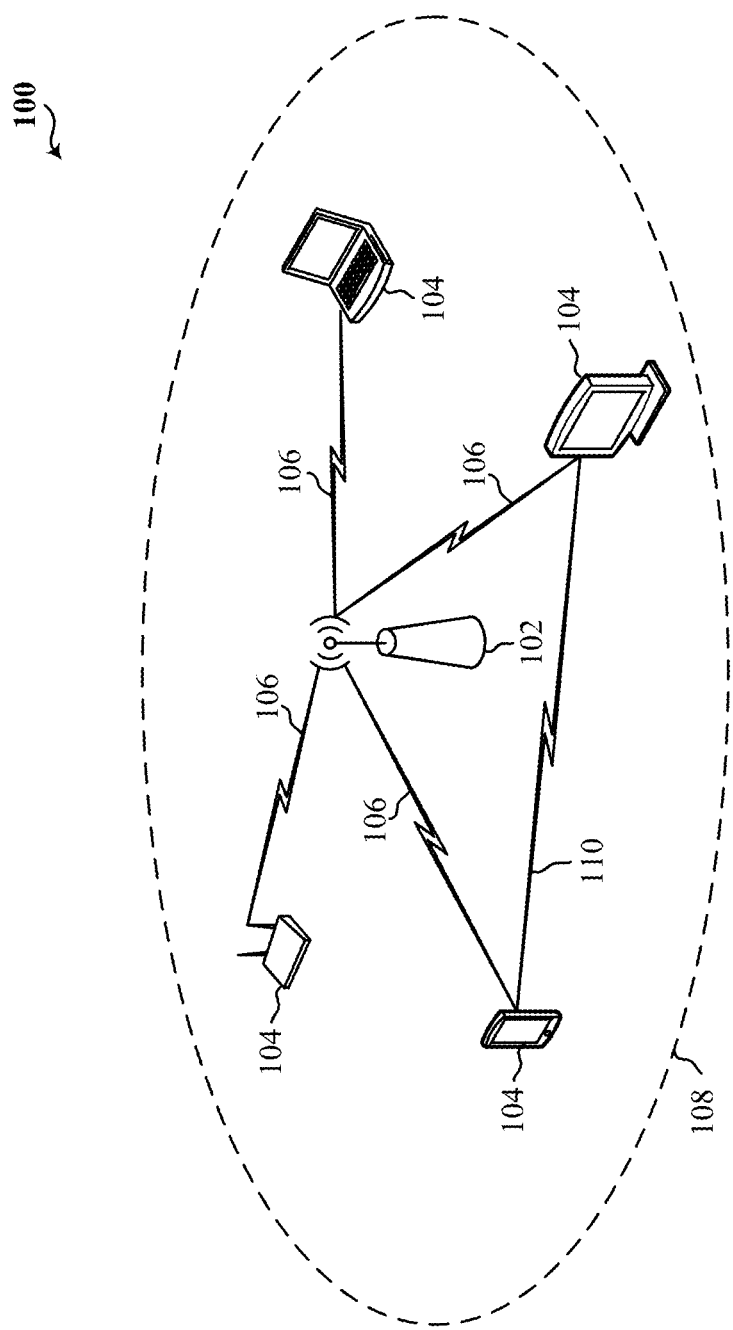
FIG. 1 shows a block diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an interne of things (IOT) network.

An AP periodically broadcasts beacon frames to enable any STAs within wireless range of the AP to establish or maintain a communication link with the WLAN. The STAs may wake from sleep states or low power modes at periodic time intervals such as target beacon transmission times (TBTTs) to receive the beacon frames. A beacon frame may include basic network information, discovery information, capabilities, and the like. Some beacon frames include a traffic indication map (TIM) element indicating the presence of queued downlink (DL) data for one or more of the STAs. Other beacon frames may include a delivery traffic indication map (DTIM) indicating whether the AP has queued DL data scheduled for transmission to one or more of the STAs. In some instances, the DTIM also may indicate the group address for a group of STAs.

Various implementations relate generally to wireless sensing using transmissions from wireless communication devices in a wireless network. For example, WiFi sensing can include one or more APs and one or more STAs in a WLAN. WiFi sensing may involve the transmission and monitoring changes in channel state information (CSI) of what might be considered standard WiFi physical layer (PHY) signals, such as frames or packets. The reflections and other alterations to the transmitted signals may be used to map and measure the environment around the wireless communication devices, including monitoring the position of objects within the environment. In other words, WiFi sensing effectively allows transmission and reception of WLAN signals to determine and monitor positions, movements, and characteristics of nearby objects based on measured changes to the CSI of transmitted signals by those nearby objects. In some aspects, two or more wireless communication devices may establish a session in advance of the transmission of signals for WiFi sensing. For example, the transmission parameters may be included in one or more frames which are generated in response to a request from one or more of the devices involved in the session. Frames to be used for sensing purposes may be transmitted according to the transmission parameters, and subsequently received and measured by one or more receiving devices in the session. Establishing such a session may enable the participating wireless communication devices to exchange parameters of the frames to be transmitted for WiFi sensing purposes. In some cases, a device participating in WiFi sensing may operate in a full-duplex mode, allowing one antenna(s) to transmit while the other antenna(s) is receiving.

Any suitable techniques may be used to detect and process changes in CSI of received signals. Changes in CSI may be detected, for example, based on a cross-correlation of one or more sequences in transmitted frames (such as in a channel estimation field). The detection may be based on the cross-correlation (CC) results. For example, the CC may be performed to detect reflections and scatters surrounding the wireless node. The detection may also be based on subtraction of normalized CSI, for example based on measurements on different frames or training sequences. Changes in CSI due to these reflections may appear as a new tap in the CC output. The wireless node may generate (such as based on the CC results) a table including a distance, angle, material classification, and speed for each target (such as a detected object). Distance may be determined, for example, by measuring a round trip time for a transmitted signal to return to the receiving antenna of the wireless node. In some cases, a sensing device may determine an angle or arrival (AoA) of a received frame, and based on the angle of arrival, the device may generate position information or three dimensional measurement information (such as based on a known location of a transmitting device, the sensing device, or a nearby object). In some cases, a sensing device may determine a direction of motion of an object. In some cases, multiple sensing devices may provide raw measurement data for a central device (such as an AP) to process and determine position sensor data (such as position/location/direction).

One of the challenges in wireless sensing, such as WiFi sensing, is ensuring the integrity of the frames transmitted for wireless sensing. For example, one or more wireless communication devices exchanging signals for wireless sensing may be attacked by an interfering wireless communication device not participating in the wireless sensing session. For example, such an interfering device may cause the distortion or corruption of measurement results. It is therefore desirable to protect the integrity of frames transmitted for use in wireless sensing in order to ensure accurate wireless sensing measurements.

Implementations of the present disclosure may provide techniques for protecting the integrity of frames transmitted for wireless sensing. For example, some aspects of the example implementations may protect the integrity of such frames by including a message integrity code (MIC). This MIC may protect at least a timestamp of the frame and enable a receiving wireless communication device to verify the integrity of the frame—and thus the timestamp—based on the MIC. However, even if the frame is verified based on the MIC, the frame may still be spoofed. For example, an interfering device may receive a frame intended for wireless sensing and repeat the frame at a different time or from a different location. A receiving device may identify such a spoofed frame by verifying the integrity of the frame, and comparing the timestamp, which is protected by the MIC, to a receipt time of the frame. When the frame is spoofed, a substantially longer time will have elapsed as compared to the expected propagation time for the frame. For example, this may be because the interfering device must receive an entire transmission the frame was included in in order to repeat the transmission. Accordingly, a receiving device may compare a difference between the receipt time of the frame and the timestamp of the frame in order to determine whether or not it may be used to wireless sensing measurements. When the difference exceeds a threshold, for example a threshold based on an expected propagation time for the frame, the frame may be discarded. However, if the difference between the receipt time of the frame and the timestamp is less than the threshold, the frame may confidently be used for one or more wireless sensing measurements.

Particular implementations of the subject matter described in this disclosure can be implemented to realize one or more of the following potential advantages. A first wireless communication device may verify the integrity of a frame received for wireless sensing purposes. For example, the first wireless communication device may verify the integrity of at least a timestamp of the received frame using a message integrity code (MIC) in the received frame. If the MIC does not verify the integrity of the received frame, the first wireless device may refrain from the use of wireless sensing measurements based on the received frame, thus preventing the use of spoofed or altered frames for wireless sensing, which may corrupt or otherwise interfere with wireless sensing. Further, even if the timestamp if verified, the frame may have been saved and repeated by an interfering wireless communication device using altered transmission parameters. Aspects of the example implementations may allow for such interfering communications to be identified. For example, the first wireless communication device may compare the timestamp to an arrival time of the received frame. When the difference between the timestamp and the arrival time exceeds a threshold time, the received frame may be discarded, as it is likely to have been spoofed by an interfering wireless communication device. Avoiding the use of such altered frames for wireless sensing purposes may increase the accuracy and reliability of wireless sensing systems.

FIG. 1 shows a block diagram of an example wireless communication network 100. According to some aspects, the example wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the example wireless communication network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves.

One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication link 106, STAs 104 also can communicate directly with each other via direct wireless links 110. Additionally, two STAs 104 may communicate via a direct communication link regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing (or packet detection (PD)) is accomplished via a measurement of the received signal strength of a valid frame, which is compared to a value to determine whether the channel is busy. For example, if the received signal strength of a detected preamble is above the value, the medium is considered busy. Physical carrier sensing also includes energy detection (ED). Energy detection involves measuring the total energy the wireless communication device receives regardless of whether the received signal represents a valid frame. If the total energy detected is above a value, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the value.

The DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Example varieties of IFS include: the short IFS (SIFS), the distributed IFS (DIFS), the extended IFS (EIFS), or the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be).

When the NAV reaches 0, the wireless communication device performs physical carrier sensing. If the channel remains idle for the appropriate IFS (for example, a DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Figure 2:
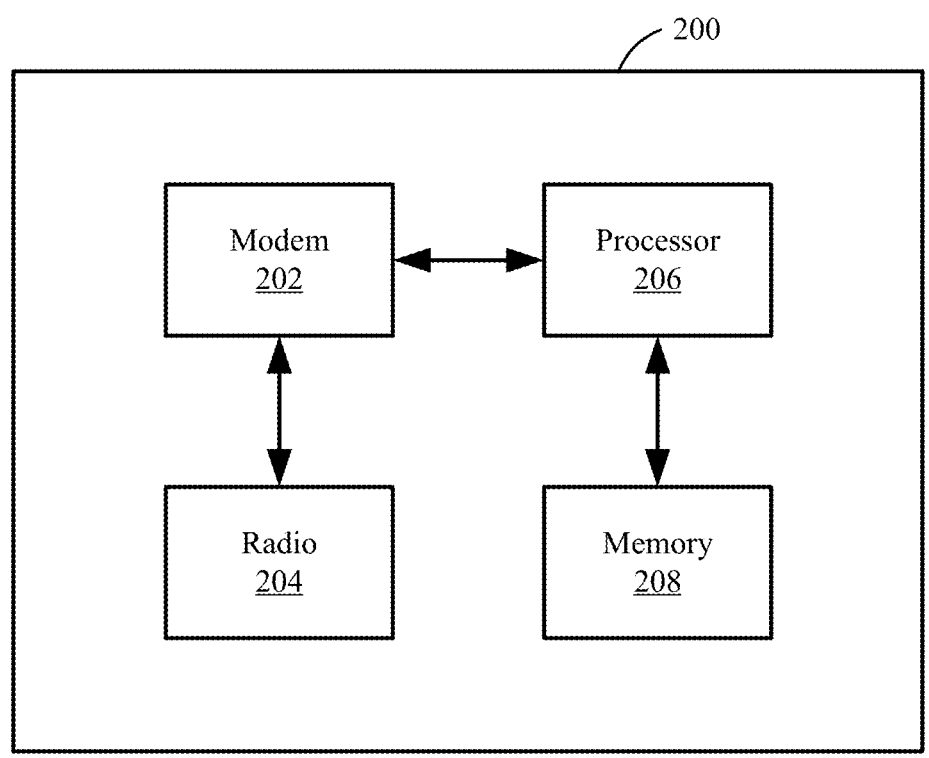
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described with reference to FIG. 1. In some implementations, the wireless communication device 200 can be an example of a device for use in an AP such as the AP 102 described with reference to FIG. 1. The wireless communication device 200 is capable of transmitting (or outputting for transmission) and receiving wireless communications (for example, in the form of wireless packets). For example, the wireless communication device 200 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 200 can be, or can include, a chip, system on chip (SoC), chipset, package, or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 200 further includes one or more processors, processing blocks, or processing elements 206 (collectively "the processor 206"), and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer, and a demultiplexer. For example, while in a transmission mode, data obtained from the processor 206 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 206) for processing, evaluation, or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which transmits the symbols via the coupled antennas. Similarly, symbols received via the antennas are obtained by the radio 204, which provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described herein.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Figure 3B:
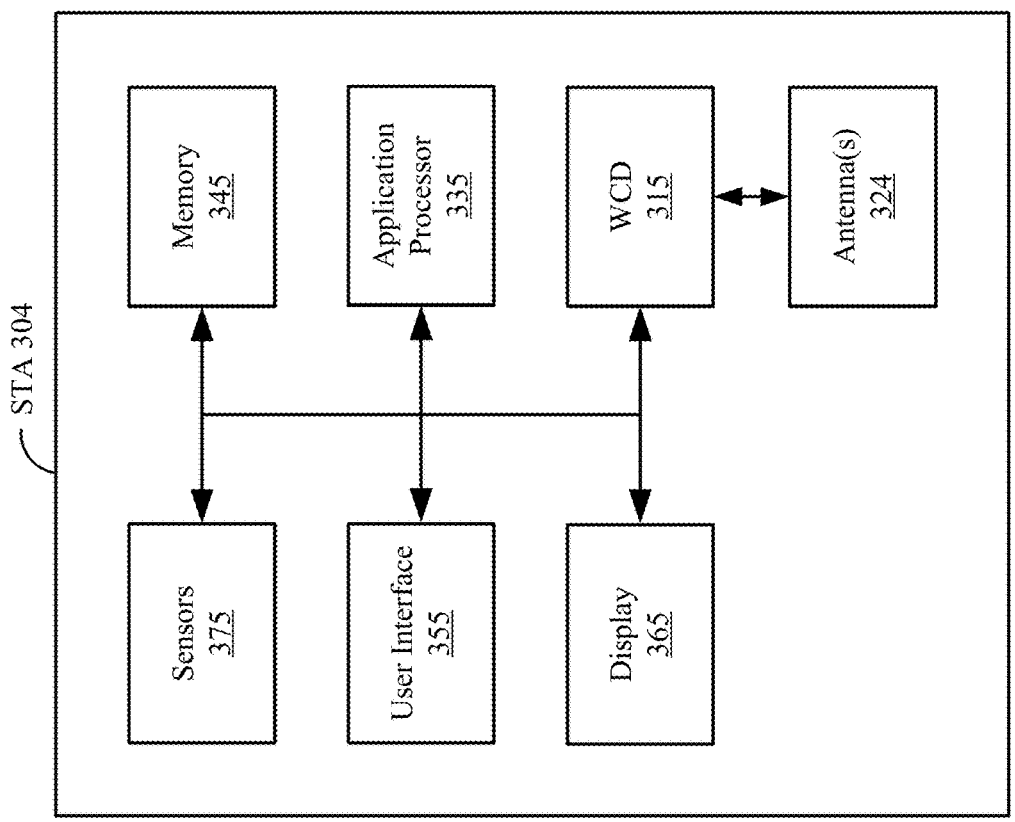
FIG. 3B shows a block diagram of an example station (STA).
Figure 3A:
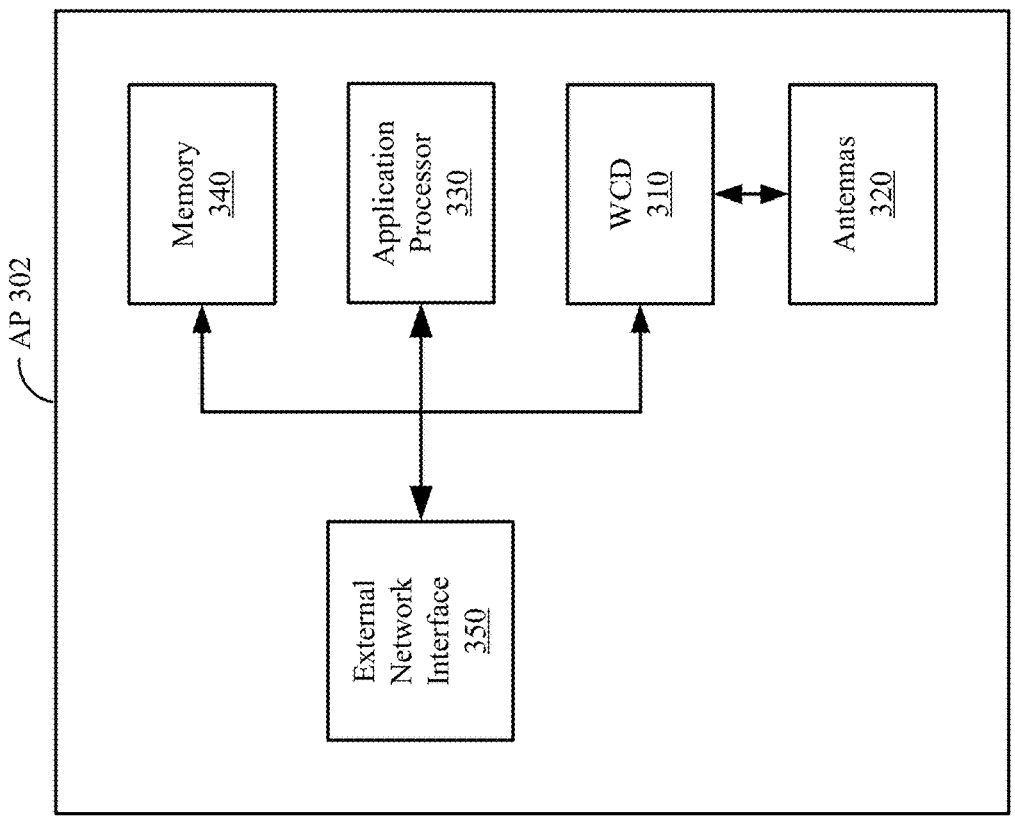
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310. For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Any of the aforementioned components can communicate with other components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315. For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365. In some other implementations, the STA 304 may include a processing system and an interface configured to perform the described functions.

Aspects of the present disclosure provide improved communications for wireless communication devices configured to operate in accordance with the IEEE 802.11 family of standards. Emerging versions of the IEEE 802.11 standards may support WiFi sensing, such as IEEE 802.11bf. For example, some WiFi sensing techniques may establish a session between devices to exchange transmission parameters for the frames to be used for sensing. For example, the transmission parameters may be included in one or more frames which are generated in response to a request from one or more of the devices involved in the session. Frames to be used for sensing measurements may be transmitted according to the transmission parameters, and subsequently received and measured by one or more receiving devices in the session. However, such WiFi sensing systems may be subject to attacks. For example, an interfering device may receive such frames and retransmit them with differing transmission parameters. This may result in inaccurate measurements when the receiving devices receive the retransmitted frames. Example implementations may enable increased reliability and accuracy of wireless sensing by providing techniques for verifying the integrity of frames transmitted for wireless sensing measurements. More particularly, at least a timestamp of a frame transmitted for wireless sensing may be protected using a message integrity code (MIC) which a receiving device may use to verify the integrity of the timestamp. In addition to verifying the integrity of the timestamp of a frame using the MIC, a difference between a receipt time of the frame and the timestamp may indicate whether or not the frame has been retransmitted, for example by an interfering device.

Figure 4:
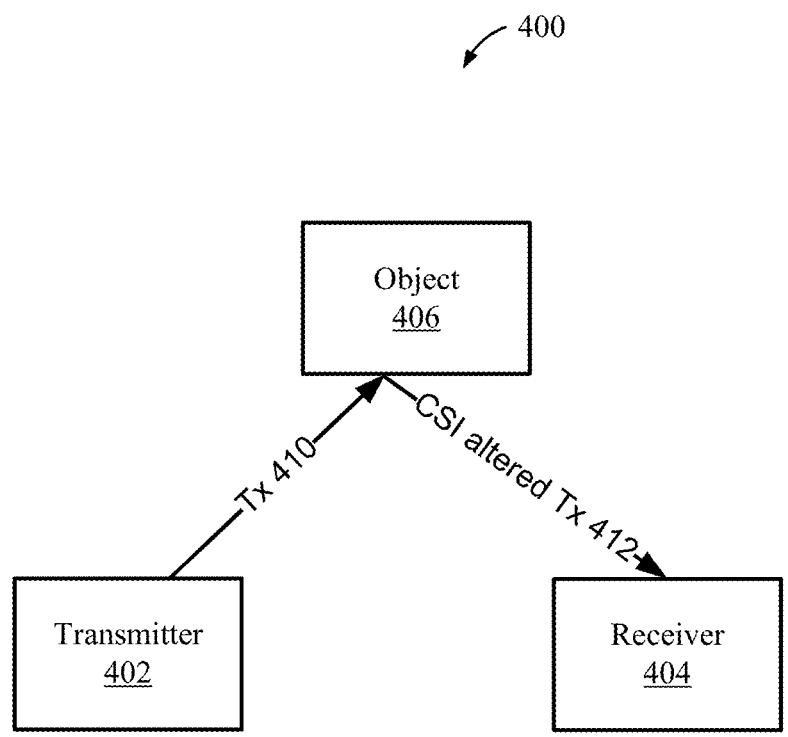
FIG. 4 shows an example wireless sensing system.

FIG. 4 shows an example wireless sensing system 400. With respect to FIG. 4, the wireless sensing system 400 is shown to include a transmitting device 402, a receiving device 404, and an object 406. The transmitting device may be any suitable device capable of transmitting wireless signals, such as the AP 102 or STA 104 of FIG. 1, or the wireless communication device 200 of FIG. 2. The receiving device 404 may be any suitable device capable of receiving wireless signals, such as the AP 102 or STA 104 of FIG. 1, or the wireless communication device 200 of FIG. 2. The object 406 may be an object in the vicinity of the transmitting device 402 and the receiving device 404, such as a wall, a piece of furniture, a person or animal, or any suitable object capable of affecting the CSI of transmitted wireless signals, for example by deflection, reflection, and so on. Note that while FIG. 4 shows a signal having its CSI altered by the object 406 by reflection, that detectable changes in CSI of transmitted wireless signals may occur without reflection, for example, the object 406 may block part of a transmitted signal, resulting in the receiving device 404 detecting a signal having lower power than would be detected without the presence of the object 406. In one example, the transmitting device 402 may transmit a transmission (Tx) 410, and the CSI of the transmission 410 may be affected by the object 406, for example deflecting or reflecting off of the object 406 and be received at the receiving device 404 as CSI altered Tx 412. Note that while FIG. 4 shows the transmitting device 402 and the receiving device 404 as separate, in some aspects, a transmitting device also may receive one or more reflections of its own transmissions and perform wireless sensing based on those received reflections. Further, note that while FIG. 4 shows only a single transmitting device 402 and a single receiving device 404, other wireless sensing systems may have any number of transmitting and receiving devices.

A receiving device, such as receiving device 404, may use any suitable techniques may be used to detect and process changes in the CSI of received signals, such as CSI altered Tx 412, which may be due to reflection, deflection, blocking, and so on caused by nearby objects. Changes in CSI may be detected, for example, based on a cross-correlation of one or more sequences in transmitted frames (such as in a channel estimation field). The detection may be based on the cross-correlation (CC) results. The detection may also be based on subtraction of normalized CSI based on measurements on different frames or training sequences. For example, the CC may be performed to detect reflections and scatters surrounding the receiving device 404. Changes in CSI due to these deflections, reflections, and so on may appear as a new tap in the CC output. The receiving device 404 may generate (such as based on the CC results) a table including a distance, angle, material classification, and speed for each target (such as a detected object 406). Distance may be determined, for example, by measuring a round trip time for a transmitted signal to return to the receiving antenna of the receiving device 404. In some cases, a sensing device may determine an angle or arrival of a reflected frame, and based on the angle of arrival, the receiving device 404 may generate position information or three dimensional measurement information (such as based on a known location of transmitting device 402, the receiving device 404, or object 406). In some cases, the receiving device 404 may determine a direction of motion of an object, such as object 406. In some cases, multiple sensing devices may provide raw measurement data for a central device (such as an AP) to process and determine position sensor data (such as position/location/direction). In some aspects, one or more machine learning models may be used for correlating changes in CSI with aspects of the detected object 406, such as a position, distance, material classification, speed, and so on.

WiFi sensing techniques may be subject to attack from interfering devices, which may retransmit frames with altered transmission parameters. For example, an interfering device may receive and save a frame transmitted by a transmitting device for wireless sensing and jam an acknowledgement of the frame. The interfering device may retransmit the saved frame using differing transmission parameters such as transmission power or an altered beam configuration. The retry bit in the retransmitted frame also may be set. This altered or spoofed and retransmitted frame may not be detectable using conventional techniques, as the retry bit is not protected and the authenticity and integrity of the contents of the frame are unchanged. In another case an interfering device may use a directional receiver antenna to receive a frame transmitted for wireless sensing purposes and save it. The interfering device may radiate interference in parallel with the received frame in order to prevent the intended recipients of the frame from receiving it. For example, the interfering device may tune the transmit antennas radiating the interference in order to limit interference with its own reception of the frame. The interfering device may repeat the saved frame using changed transmission parameters. Conventional techniques may not be capable of detecting this spoofed frame, as the authenticity and integrity of the frame are unchanged, but the changed transmission parameters may significantly impact wireless sensing measurements from receiving devices. Further, an interfering device may receive a frame transmitted for wireless sensing purposes and relay it. For example, the interfering device may receive the frame from one direction and relay or retransmit the frame in one or more different directions. Again, conventional techniques may not be capable of detecting this interference, as the authenticity and integrity of the frame are unchanged, but the altered direction of transmission and potentially altered transmission parameters may significantly impact wireless sensing measurements from receiving devices.

Figure 5:
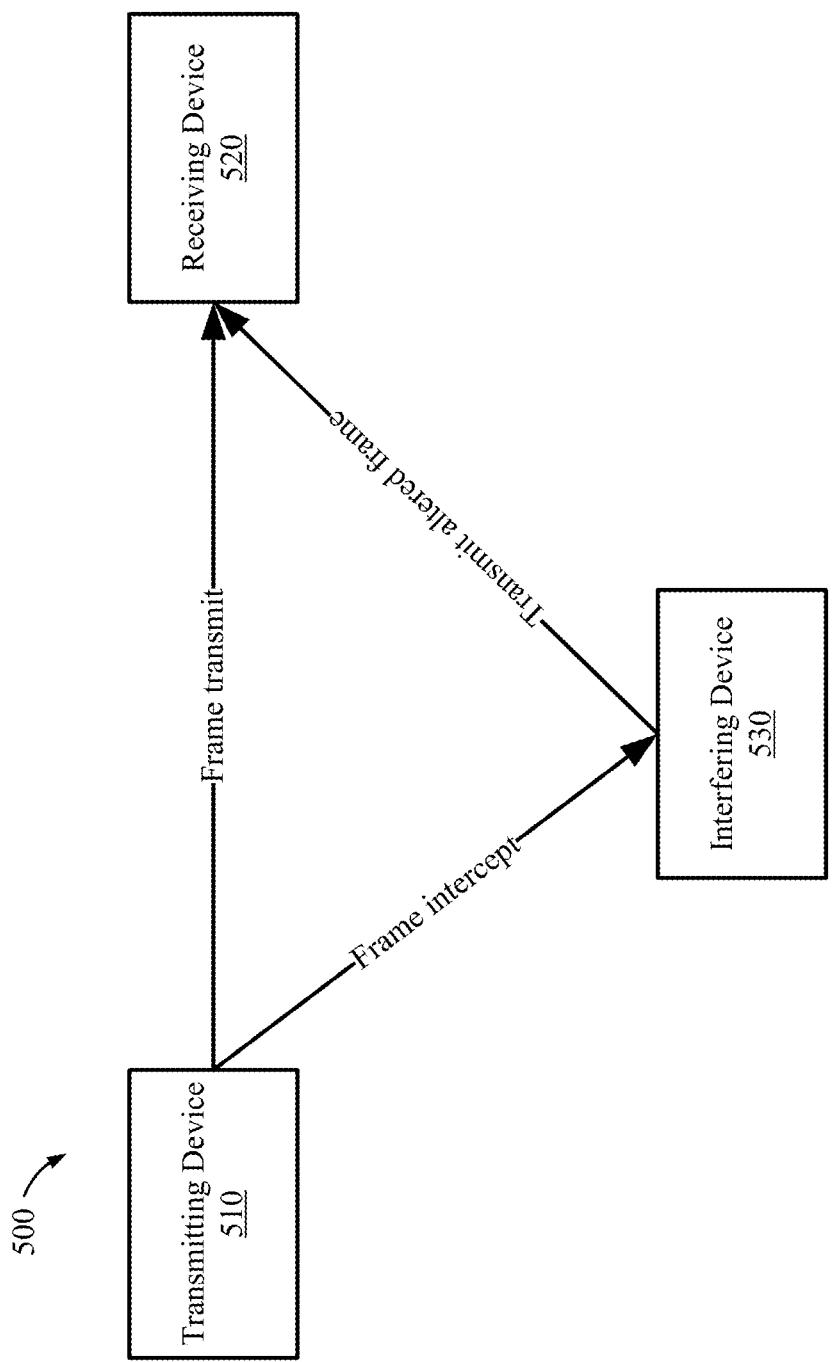
FIG. 5 shows an example wireless sensing system under attack by an interfering device.

FIG. 5 shows an example wireless sensing system 500 under attack by an interfering device. More particularly, a transmitting device 510 is transmitting a frame to a receiving device 520 for the receiving device to perform one or more wireless sensing measurements based on the received frame. For example, the transmitting device 510 and the receiving device 520 may have previously established a wireless sensing session, exchanging information about the transmission parameters for the frames transmitted by the transmitting device 510. An interfering device 530 also may be within transmission range of the transmitting device 510 and the receiving device 520. In some aspects, the transmitting device 510 and the receiving device 520 may be wireless communications devices such as an AP 102 or STA 104 of FIG. 1, a wireless communication device 200 of FIG. 2, an AP 302 of FIG. 3A, a STA 304 of FIG. 3B, and so on. The interfering device 530 also may be a wireless communication device such as an AP a STA, or similar. The interfering device 530 also may receive, or intercept, the frame transmitted to the receiving device 520. The interfering device may retransmit the received frame using altered transmission parameters. For example, the retransmitted frame could be transmitted after jamming an acknowledgment of the received frame, after jamming reception of the transmitted frame, or may be relayed concurrently with the transmitted frame. Because conventional techniques may not be capable of detecting such altered frames, it is desirable for such altered frames to be detectable to avoid the resulting impaired accuracy and reliability.

Aspects of the example implementations provide techniques for discovering altered frames transmitted by interfering devices and preventing wireless sensing measurements based on those altered frames from impairing wireless sensing systems. More particularly, the example implementations allow the altered frames to be discovered in part by allowing the integrity of a received frame to be verified by a receiving device. For example, a timestamp of the frame may be protected by a message integrity code (MIC) of the frame, such that a receiving device may verify the integrity of the timestamp by verifying the MIC of the frame. Note that a frame which is retransmitted with altered transmission parameters may pass such a verification, as the contents of the frame are unchanged. However, the delay between the initial transmission by the transmitting device and the retransmission by the interfering device may allow such a retransmitted frame to be discovered by comparing the receipt time of a frame to the verified timestamp. For an unaltered frame, the difference between the receipt time and the verified timestamp will be much smaller than for a retransmitted frame. For an unaltered frame, this difference is approximately the expected propagation time of the frame, while for a retransmitted frame this difference may be much larger, as the interfering device must save the frame in order to retransmit it. Further, the propagation time of the frame may be much shorter than the duration of the training fields in the frame to be protected. Accordingly, in some aspects, a receiving device may verify the integrity of the timestamp of a received frame based on the MIC of the received frame and determine whether or not to perform wireless sensing measurements for the frame based on the difference between the receipt time of the frame and the verified timestamp.

Figure 6:
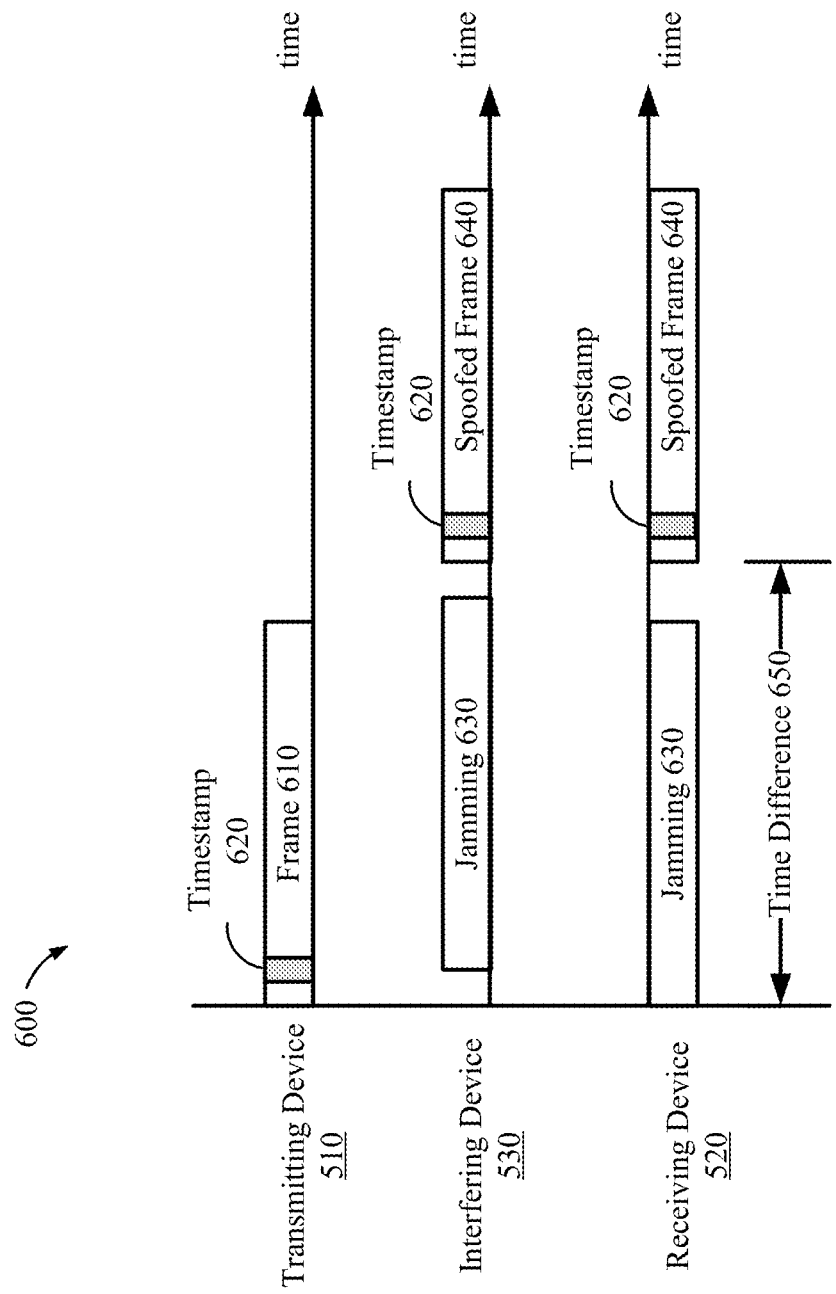
FIG. 6 shows a time sequence diagram showing transmission and reception of frames for wireless sensing in the presence of an interfering device.

FIG. 6 shows a time sequence diagram 600 showing transmission and reception of frames for wireless sensing in the presence of an interfering device, according to some example implementations. In some aspects, the time sequence diagram 600 may illustrate timing of signals transmitted by the devices in the wireless sensing system 500 of FIG. 5. The transmitting device 510 may transmit a frame 610 to a receiving device 520. The frame 610 may include a timestamp 620 whose integrity is protected by a MIC in the frame 610. The interfering device 530 may transmit jamming 630 to prevent reception of the frame 610 by the receiving device 520. Subsequently, the interfering device 530 may transmit a spoofed frame 640. The spoofed frame 640 may be a retransmission of the frame 610 using different transmission parameters, and thus the spoofed frame 640 includes the timestamp 620. The receiving device 520 may fail to receive the frame 610 due to the jamming 630 and may subsequently receive the spoofed frame 640. The receiving device may verify the integrity of the timestamp 620 based on the MIC included in the spoofed frame 640 and may determine a time difference 650 between the receipt time of the spoofed frame and the timestamp 620. This time difference 650 greatly exceeds the expected propagation time for the frame 610, and thus the receiving device 520 may determine that the frame should not be used for wireless sensing measurements and may therefore discard the spoofed frame 640. In some aspects, the time difference 650 may be compared to a threshold time difference which is based on the expected propagation time. For example, this threshold may be a small multiple of the expected propagation time, such as a single-digit multiple of the expected propagation time.

Note that while FIG. 6 shows transmission of a single frame, the frame including the timestamp 620 may protect one or more other frames included in the same transmission. For example, when the frame is included in a PPDU, verifying the timestamp may protect all MPDUs in the PPDU. Similarly when the PPDU is included in an aggregated PPDU (A-PPDU), all other PPDUs in the A-PPDU may be protected by the timestamp. Thus, verifying the timestamp 620 based on the associated MIC also verifies the integrity of these remaining frames in the same transmission.

Figure 7:
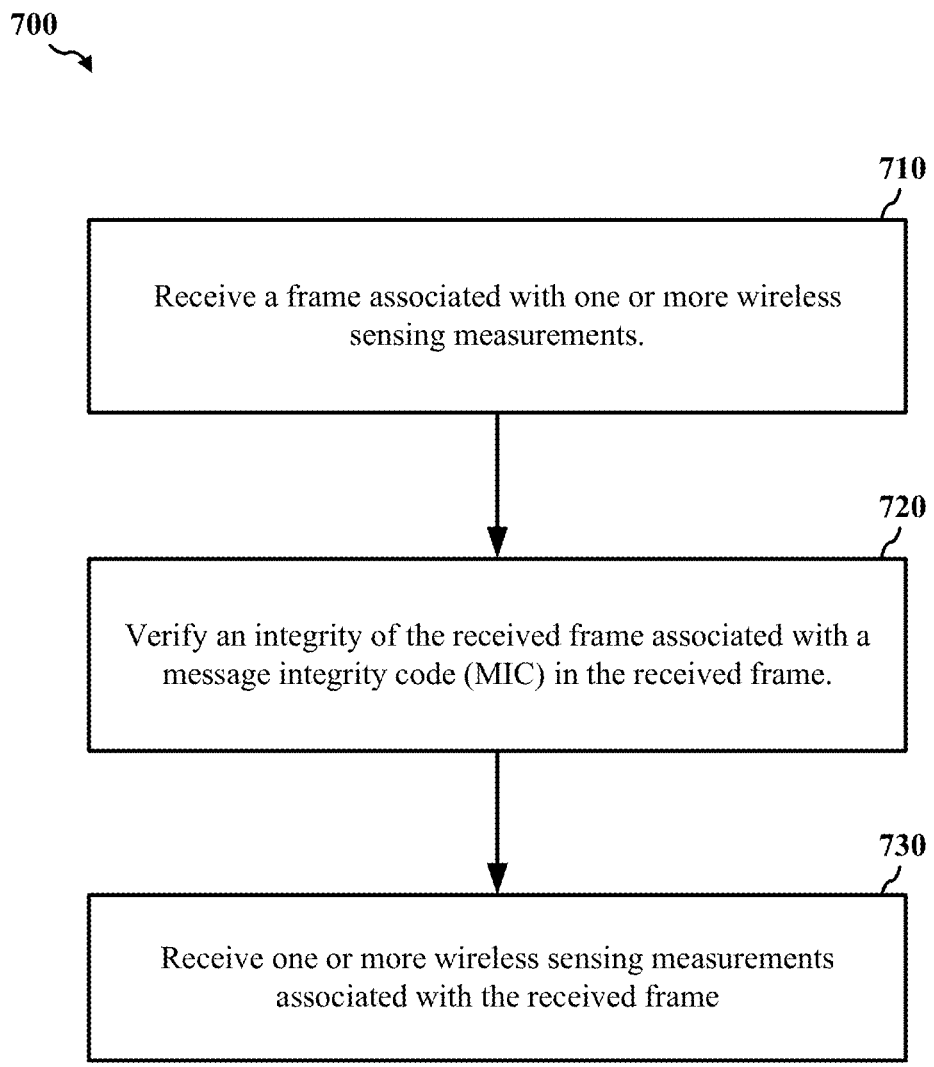
FIG. 7 shows a flowchart illustrating an example operation for wireless communication that supports wireless sensing.

FIG. 7 shows a flowchart illustrating an example operation 700 for wireless communication that supports wireless sensing, according to some implementations. In some implementations, the operation 1000 may be performed by a first wireless communication device, which may be a wireless communication device operating as or within an AP, such the AP 102 of FIG. 1, the wireless communication device 200 of FIG. 2 or the AP 302 of FIG. 3A. In some other implementations, the operation 1000 may be performed by a wireless communication device operating as or within a STA, such as the STA 104 of FIG. 1, the wireless communication device 200 of FIG. 2, or the STA 304 of FIG. 3B.

For example, at block 710, the wireless communication device 200 receives a frame associated with one or more wireless sensing measurements. At block 720, the wireless communication device 200 verifies an integrity of the received frame associated with a message integrity code (MIC) in the received frame. At block 730, the wireless communication device 200 receives one or more wireless sensing measurements associated with the received frame.

In some aspects, the MIC is configured to verify the integrity of a timestamp of the received frame. In some aspects, the wireless communication device 200 validates the timestamp with the MIC. In some aspects, verifying the integrity of the received frame is further based at least in part on a difference between an arrival time of the frame and the timestamp. In some aspects, the integrity of the received frame is verified when the difference between the arrival time of the frame and the timestamp is less than a threshold time. In some aspects the integrity of the received frame is not verified when the difference is greater than the threshold time. In some aspects the threshold time is based at least in part on an estimated propagation time for transmitting the received frame from the second wireless communication device to the first wireless communication device.

In some aspects, verifying the integrity of the received frame also verifies an integrity of one or more media access control (MAC) protocol data units (MPDUs) received in a common transmission with the received frame. In some aspects, verifying the integrity of the received frame also verifies an integrity of one or more aggregated physical layer (PHY) protocol data units (A-PPDUs) received in a common transmission with the received frame.

In some aspects, the operation 700 may further include, prior to receiving the frame in block 710, establishing a wireless sensing session with at least a second wireless communication device, and the frame is received from the second wireless communication device.

Figure 8:
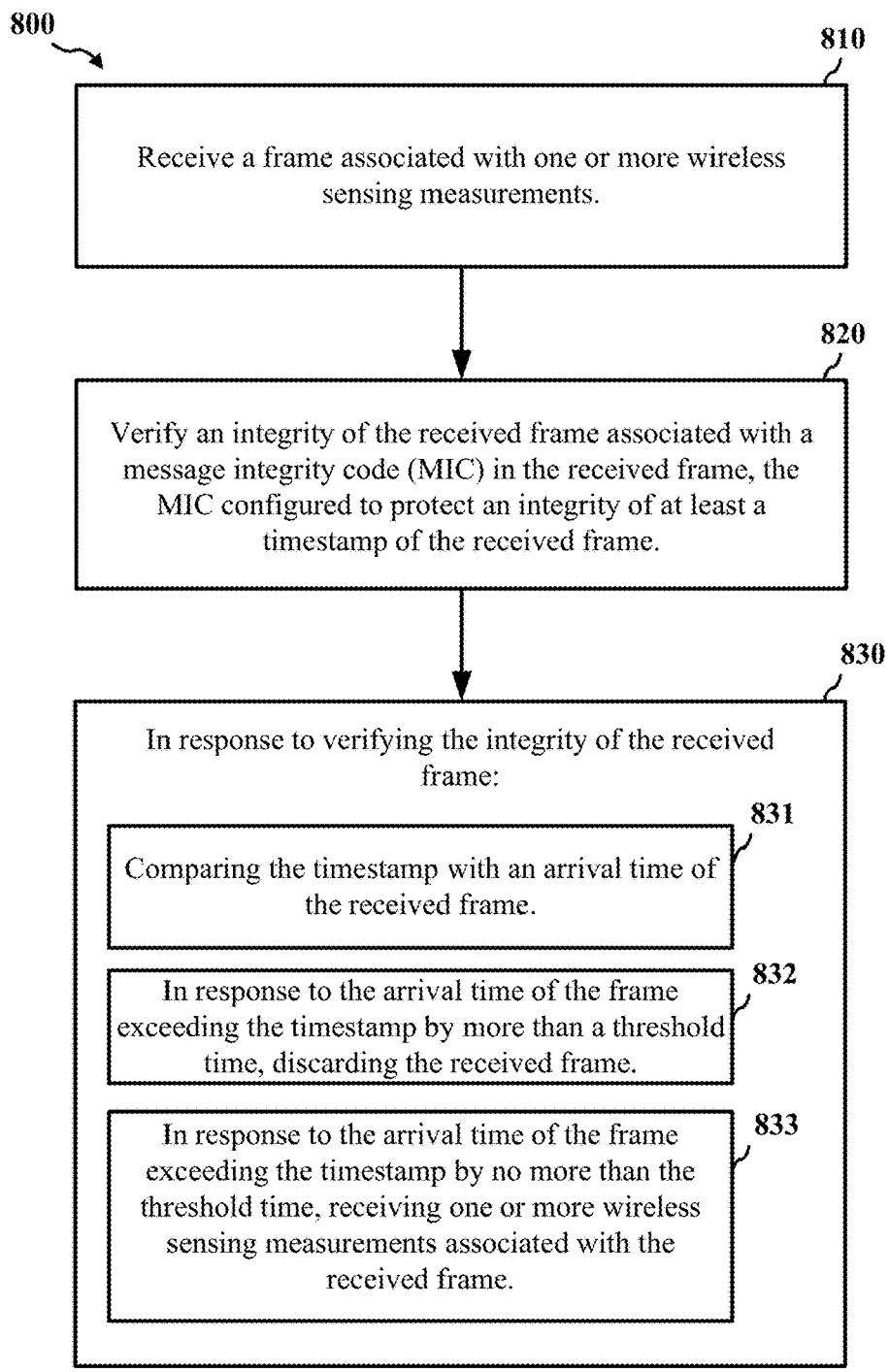
FIG. 8 shows a flowchart illustrating an example operation for wireless communications that supports wireless sensing.

FIG. 8 shows a flowchart illustrating an example operation 800 for wireless communications that supports wireless sensing, according to some implementations. In some implementations, the operation 800 may be performed by a first wireless communication device, which may be a wireless communication device operating as or within an AP, such the AP 102 of FIG. 1, the wireless communication device 200 of FIG. 2 or the AP 302 of FIG. 3A. In some other implementations, the operation 800 may be performed by a wireless communication device operating as or within a STA, such as the STA 104 of FIG. 1, the wireless communication device 200 of FIG. 2, or the STA 304 of FIG. 3B.

For example, at block 810, the wireless communication device 200 receives a frame associated with one or more wireless sensing measurements. At block 820, the wireless communication device 200 verifies an integrity of the received frame associated with a message integrity code (MIC) in the received frame, the MIC configured to protect an integrity of at least a timestamp of the received frame. At block 830, in response to verifying the integrity of the received frame, the wireless communication device 200 compares the timestamp with an arrival time of the received frame (831), in response to the arrival time of the frame exceeding the timestamp by more than a threshold time, discards the received frame (832), and in response to the arrival time exceeding the timestamp by no more than the threshold time, receives one or more wireless sensing measurements based at least in part on the received frame (833).

Implementation examples are described in the following numbered clauses:

1. A first wireless communication device, including:
an interface configured to:
obtain a frame associated with one or more wireless sensing measurements;
a processing system configured to:
verify an integrity of the received frame associated with a message integrity code (MIC) in the received frame; and
the interface further configured to:
obtain one or more wireless sensing measurements associated with the received frame.

2. The first wireless communication device of clause 1, where the MIC is configured to protect the integrity of a timestamp of the frame.

3. The first wireless communication device of clause 2, where verifying the integrity of the frame includes validating the timestamp with the MIC.

4. The first wireless communication device of any of clauses 2-3, where verifying the integrity of the frame is associated with a difference between an arrival time of the frame and the timestamp.

5. The first wireless communication device of clause 4, where verification of the integrity of the received frame is associated with the difference between the arrival time of the frame and the timestamp being less than a threshold time.

6. The first wireless communication device of clause 5, further includes refraining from verifying the integrity of the frame when the difference is greater than the threshold time.

7. The first wireless communication device of clause 5, where the threshold time is associated with an estimated propagation time of the frame.

8. The first wireless communication device of any of clauses 1-7, where verifying the integrity of the frame includes validating an entirety of one or more media access control (MAC) protocol data units (MPDUs) associated with the received frame.

9. The first wireless communication device of any of clauses 1-7, where verifying the integrity of the frame includes validating one or more aggregated physical layer (PHY) protocol data units (A-PPDUs) associated with the received frame.

10. The first wireless communication device of any of clauses 1-9, further including establishing a wireless sensing session with at least a second wireless communication device prior to obtaining the frame, wherein the frame is obtained from the second wireless communication device.

11. A method for wireless communication performed by an apparatus of a first wireless communication device including:
receiving a frame associated with one or more wireless sensing measurements;
verifying an integrity of the received frame associated with a message integrity code (MIC) in the received frame; and
receiving one or more wireless sensing measurements associated with the received frame.

12. The method of clause 11, where the MIC is configured to verify the integrity of a timestamp of the received frame.

13. The method of claim 12, where verifying the integrity of the received frame includes validating the timestamp with the MIC.

14. The method of any of clauses 12-13, where verifying the integrity of the received frame is associated with a difference between an arrival time of the frame and the timestamp.

15. The method of clause 14, where verification of the integrity of the received frame is associated with the difference between the arrival time of the frame and the timestamp being less than a threshold time.

16. The method of clause 15, further including refraining from verifying the integrity of the received frame when the difference is greater than the threshold time.

17. The method of clause 15, where the threshold time is associated with an estimated propagation time of the received frame.

18. The method of any of clauses 11-17, where verifying the integrity of the received frame includes validating an entirety of one or more media access control (MAC) protocol data units (MPDUs) associated with the received frame.

19. The method of any of clauses 11-17, where verifying the integrity of the received frame includes validating one or more aggregated physical layer (PHY) protocol data units (A-PPDUs) associated with the received frame.

20. The method of any of clauses 11-19, further including establishing a wireless sensing session with at least a second wireless communication device prior to receiving the frame, wherein the frame is received from the second wireless communication device.

21. A non-transitory computer-readable storage medium storing instructions, that, when executed by one or more processors of a first wireless communication device, cause the first wireless communication device to perform operations including:
receiving a frame associated with one or more wireless sensing measurements;
verifying an integrity of the received frame associated with a message integrity code (MIC) in the received frame; and
receiving one or more wireless sensing measurements associated with the received frame.

22. The non-transitory computer-readable storage medium of clause 21, where the MIC is configured to protect the integrity of a timestamp of the received frame.

23. The non-transitory computer-readable storage medium of clause 22, where verifying the integrity of the received frame includes validating the timestamp with the MIC.

24. The non-transitory computer-readable storage medium of any of clauses 22-23, where verifying the integrity of the received frame is associated with a difference between an arrival time of the frame and the timestamp.

25. The non-transitory computer-readable storage medium of clause 24, where verification of the integrity of the received frame is associated with the difference between the arrival time of the frame and the timestamp being less than a threshold time.

26. The non-transitory computer-readable storage medium of clause 25, where execution of the instructions causes the first wireless communication device to perform operations further including refraining from verifying the integrity of the received frame when the difference is greater than the threshold time.

27. The non-transitory computer-readable storage medium of clause 25, where the threshold time is associated with an estimated propagation time of the received frame.

28. The non-transitory computer-readable storage medium of any of clauses 21-27, wherein execution of the instructions causes the first wireless communication device to perform operations further comprising establishing a wireless sensing session with at least a second wireless communication device prior to receiving the frame, wherein the frame is received from the second wireless communication device.

29. The non-transitory computer-readable storage medium of any of clauses 21-28, where verifying the integrity of the received frame includes validating an entirety of one or more media access control (MAC) protocol data units (MPDUs) associated with the received frame.

30. A method for wireless communication performed by an apparatus of a first wireless communication device, including:
receiving a frame associated with one or more wireless sensing measurements;
verifying an integrity of the received frame associated with a message integrity code (MIC) in the received frame, the MIC configured to protect an integrity of at least a timestamp of the received frame;
in response to verifying the integrity of the received frame:
  comparing the timestamp with an arrival time of the received frame.
  in response to the arrival time of the frame exceeding the timestamp by more than a threshold time, discarding the received frame; and
  in response to the arrival time of the frame exceeding the timestamp by no more than the threshold time, receiving one or more wireless sensing measurements associated with the received frame.

As used herein, a phrase referring to "at least one of" a list of items refers to any combination of those items, including single members. As an example, "at least one of: a, b, or c" is intended to cover: a, b, c, a-b, a-c, b-c, and a-b-c. The term "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A first wireless communication device, comprising: an interface configured to:
   obtain a frame associated with one or more wireless sensing measurements;
   a processing system configured to:
   verify an integrity of the frame associated with a message integrity code (MIC) in the frame by validating a timestamp of the frame with the MIC and comparing an arrival time of the frame to the timestamp that has been validated with the MIC; and
   the interface further configured to:
   obtain one or more wireless sensing measurements associated with the frame.

2. The first wireless communication device of claim 1, wherein the MIC is configured to protect the integrity of the timestamp of the frame.

3. The first wireless communication device of claim 2, wherein verifying the integrity of the frame is associated with a difference between the arrival time of the frame and the timestamp.

4. The first wireless communication device of claim 3, wherein verification of the integrity of the frame is associated with the difference between the arrival time of the frame and the timestamp being less than a threshold time.

5. The first wireless communication device of claim 4, further comprising refraining from verifying the integrity of the frame when the difference is greater than the threshold time.

6. The first wireless communication device of claim 4, wherein the threshold time is associated with an estimated propagation time of the frame.

7. The first wireless communication device of claim 1, wherein verifying the integrity of the frame further includes validating an entirety of one or more media access control (MAC) protocol data units (MPDUs) associated with the frame.

8. The first wireless communication device of claim 1, wherein verifying the integrity of the frame further includes validating one or more aggregated physical layer (PHY) protocol data units (A-PPDUs) associated with the frame.

9. The first wireless communication device of claim 1, further comprising establishing a wireless sensing session with at least a second wireless communication device prior to receiving the frame, wherein the frame is obtained from the second wireless communication device.

10. A method for wireless communication performed by an apparatus of a first wireless communication device, comprising:
    receiving a frame associated with one or more wireless sensing measurements;
    verifying an integrity of the received frame associated with a message integrity code (MIC) in the received frame by validating a timestamp of the received frame with the MIC and comparing an arrival time of the received frame to the timestamp that has been validated with the MIC; and
    receiving one or more wireless sensing measurements associated with the received frame.

11. The method of claim 10, wherein the MIC is configured to verify the integrity of a timestamp of the received frame.

12. The method of claim 11, wherein verifying the integrity of the received frame is associated with a difference between the arrival time of the frame and the timestamp.

13. The method of claim 12, wherein verification of the integrity of the received frame is associated with the difference between the arrival time of the frame and the timestamp being less than a threshold time.

14. The method of claim 13, further comprising refraining from verifying the integrity of the received frame when the difference is greater than the threshold time.

15. The method of claim 13, wherein the threshold time is associated with an estimated propagation time of the received frame.

16. The method of claim 10, wherein verifying the integrity of the received frame further includes validating an entirety of one or more media access control (MAC) protocol data units (MPDUs) associated with the received frame.

17. The method of claim 10, wherein verifying the integrity of the received frame further includes validating one or more aggregated physical layer (PHY) protocol data units (A-PPDUs) associated with the received frame.

18. The method of claim 10, further comprising establishing a wireless sensing session with at least a second wireless communication device prior to receiving the frame, wherein the frame is received from the second wireless communication device.

19. A non-transitory computer-readable storage medium storing instructions, that, when executed by one or more processors of a first wireless communication device, cause the first wireless communication device to perform operations comprising:
   receiving a frame associated with one or more wireless sensing measurements;
   verifying an integrity of the received frame associated with a message integrity code (MIC) in the received frame by validating a timestamp of the received frame with the MIC and comparing an arrival time of the received frame to the timestamp that has been validated with the MIC; and
   receiving one or more wireless sensing measurements associated with the received frame.

20. The non-transitory computer-readable storage medium of claim 19, wherein the MIC is configured to protect the integrity of the timestamp of the received frame.

21. The non-transitory computer-readable storage medium of claim 20, wherein verifying the integrity of the received frame is associated with a difference between the arrival time of the frame and the timestamp.

22. The non-transitory computer-readable storage medium of claim 21, wherein verification of the integrity of the received frame is associated with the difference between the arrival time of the frame and the timestamp being less than a threshold time.

23. The non-transitory computer-readable storage medium of claim 22, wherein execution of the instructions causes the first wireless communication device to perform operations further comprising refraining from verifying the received frame when the difference is greater than the threshold time.

24. The non-transitory computer-readable storage medium of claim 22, wherein the threshold time is associated with an estimated propagation time of the received frame.

25. The non-transitory computer-readable storage medium of claim 19, wherein execution of the instructions causes the first wireless communication device to perform operations further comprising establishing a wireless sensing session with at least a second wireless communication device prior to receiving the frame, wherein the frame is received from the second wireless communication device.

26. The non-transitory computer-readable storage medium of claim 19, wherein execution of the instructions for verifying the integrity of the received frame causes the first wireless communication device to perform operations further comprising validating an entirety of one or more media access control (MAC) protocol data units (MPDUs) associated with the received frame.

27. A method for wireless communication performed by an apparatus of a first wireless communication device, comprising:
   receiving a frame associated with one or more wireless sensing measurements;
   verifying an integrity of the received frame associated with a message integrity code (MIC) in the received frame, the MIC configured to protect an integrity of at least a timestamp of the received frame;
   in response to the verifying the integrity of the received frame:
      comparing the timestamp with an arrival time of the received frame;
      in response to the arrival time of the received frame exceeding the timestamp by more than a threshold time, discarding the received frame; and
      in response to the arrival time of the received frame exceeding the timestamp by no more than the threshold time, receiving one or more wireless sensing measurements associated with the received frame.

* * * * *